Patented June 24, 1930

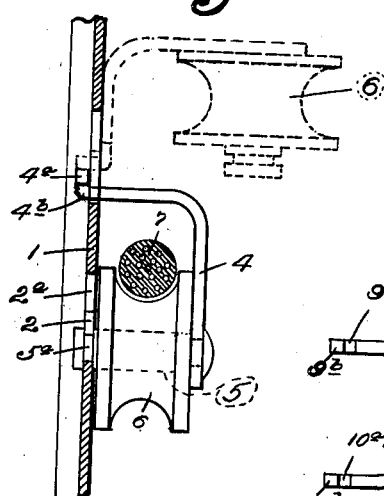

1,766,254

UNITED STATES PATENT OFFICE

JAMES R. KEARNEY, OF KANSAS CITY, MISSOURI

CABLE RACK

Application filed April 17, 1922. Serial No. 553,321.

Figure 1 is a side elevational view partly in section of one form of my improved cable rack and bracket.

Figure 2 is a side elevational view of a modified form of insulation support.

Figure 3 is a bottom plan view of the form of support shown in Figure 2.

Figure 4 is an end elevational view of the form of support shown in Figure 2.

Figure 5 is a modified form showing a double insulation carried by a single support.

Figure 6 is a side elevational view of a modified form of support.

Figure 7 is a side elevational view of another modified form of support.

Figure 8 is a front elevational view of the form shown in Figure 7.

Figure 9 is a side elevational view of another modified form of support.

This invention relates to a new and useful improvement in cable racks and brackets, the object being to construct a supporting base having a plurality of recesses by which insulation mounts may be adjustably supported in position, said mounts carrying different types or forms of insulation according to the cable mounting requirements. I prefer to form the openings in the supporting base in the shape of which might be termed a "double keyhole", i. e., each opening is larger at its medial portion than the upwardly or downwardly communicating slots or recesses, whereby the supporting base is reversible and may be used either in a vertical or a horizontal position according to requirements.

Another object of my invention is to lock at least one of the legs of the supporting bracket to the supporting base in such manner that the bracket must be turned at an angle to its normal position for insertion and removal.

Another object is to construct the supporting brackets in such a way that different types of insulations carried thereby may be mounted on the same supporting base.

In the drawings, 1 indicates a supporting base as shown in Figures 1, 7 and 8, which is preferably in the form of a channel-shaped member, the web of which is provided with "double keyhole" openings 2, the medial portion of each opening being larger than the laterally extending recesses or slots $2^a$, which recesses or slots are diametrically opposed to each other. These supporting bases may be of any desired length, and are provided with one or more openings at appropriate points by which they may be held in position by lag screws or other fastening devices, indicated at 3 in Figure 8.

4 indicates a supporting bracket, shown in Figure 1 as a bent flat bar having an opening in its lower end in which is mounted a stud 5, the end of said stud being riveted or upset over the bracket 4. The inner end of stud 5 is provided with a reduced annulus $5^a$.

6 indicates an insulation, shown in this form as a roller, on which is supported a cable 7. Stud 5 is of slightly less diameter than the enlarged portion 2 of the opening, and therefore, may be inserted in said enlarged portion and when moved downwardly the reduced annulus $5^a$ will receive the edges of the recess or downwardly extending slot in the supporting base, whereby the stud 5 is interlocked with the supporting base.

The upper end of bracket 4 is preferably bent up as at $4^a$ and is cut-away as at $4^b$, the width of the bar between these cutaway portions being slightly less than the recesses or slots $2^a$, while the width of the bracket bar and the bent end $4^a$ thereof is greater than the enlarged portion of the opening 2. Hence, to assemble the parts, it is necessary to introduce the head $4^a$ vertically through the opening $2$—$2^a$, which means that the bracket occupies approximately an angular position of ninety degrees relative to its normal or operative position.

After the head has been introduced into the recess $2$—$2^a$, the bracket is then turned to its normal or operative position in which it can be swung to the dotted line position shown in Figure 1 and the cable introduced between the edge of the roller and the cross-connecting member of the bracket.

After the cable is introduced, the end of stud 5 is inserted in the enlargement of one of the recesses 2 and the bracket is then permitted to drop downwardly toward the edges of one of the recesses $2^a$ engaged in the annulus 5ª, and in this downward movement of the bracket the recess 4ᵇ also receives the edges of the constricted portion 2ª of another recess, so that when finally seated home, the bracket is locked in position at both its upper and lower extremities and is then prevented from accidental displacement.

In order to remove the cable, it is only necessary to raise the bracket until the stud lies in the enlarged portion of its recess, whereupon the bracket can be swung upwardly, as indicated in dotted lines. And if it is desired to remove the bracket, it can be turned to an angular position of ninety degrees so that its head portion 4ª can be withdrawn from the vertical elongated recesses 2—2ª.

In Figures 2, 3 and 4, I have shown another form of bracket in which the cable support in the form of an insulation roller 8 is arranged on an axle or pin 8ª disposed parallel to the web of the supporting base instead of at right angles thereto, as shown in Figure 1. In this form of bracket, the upper leg 9 is provided with a recess 9ª and a head portion 9ᵇ which latter is wider than the enlarged portion 2 of the recess in the supporting base. The lower leg 10 has a recess 10ª but its head portion 10ᵇ is of a width slightly narrower than the enlarged portion of the recess, so that while it is necessary in this form to turn the bracket at an angle of 90 degrees to insert the upper leg into the recess or opening, the lower leg can be moved into locking position when the legs are in vertical alignment. This form of bracket can be used to advantage in supporting vertical stretches of cable.

In Figure 5, I have shown a form of my invention in which there are two supporting insulations indicated as rollers 11 and 12, there being one of these rollers on each end of the supporting pin 8ᵇ which in this form project equidistantly on each side of the bracket 13.

In Figure 6, I have shown a form of bracket similar to that illustrated in Figures 2 to 5, inclusive, except that the upper leg 14 has a stud pin 15 riveted therein for the purpose of supporting an insulation roller 16.

In Figure 9, I have shown a form of bracket similar to that shown in Figure 6, except that a glass insulation 17 is detachably mounted on the upper leg 18 of the bracket.

In operation, the base supports may be vertically or horizontally arranged and by selecting an appropriate form of bracket the particular type of insulation cables or wires can be readily attached in or removed from position, the brackets and their insulations readily lending themselves to supporting cables stretched horizontally, vertically, at an angle, around corners, or in curves, which conditions are frequently met with in power houses, manholes, etc.

What I claim is:

In a cable support, a base member provided with perforations, said perforations having a greater length than width and provided with an enlarged central portion and restricted end portions, a cable supporting rack having an arm provided with a bent up end portion wider than the enlarged portion of the perforation adapted to pass into one of the perforations lengthwise thereof and including a notched portion for slidable engagement with the restricted portion of the perforation, and another arm on said rack provided with locking means adapted to pass into the enlarged portion of another perforation and notched to permit positioning thereof upon a sliding movement into a restricted portion of said last-named perforation, said second arm provided with means to support a cable between said arms, the connection between the first-named arm and the base being such as to permit swinging of the second arm about said connection as a pivot after upward movement of said second arm.

In testimony whereof I hereunto affix my signature this 10th day of April, 1922.

JAMES R. KEARNEY.